(12) United States Patent
Ngo et al.

(10) Patent No.: US 7,366,419 B2
(45) Date of Patent: Apr. 29, 2008

(54) SPATIAL TRANSMIT/RECEIVE ISOLATION METHOD FOR OPTICAL COMMUNICATION SYSTEMS

(75) Inventors: Kiet D. Ngo, Hermosa Beach, CA (US); David P. Dixon, Torrance, CA (US); Steven B. Schrier, Hawthorne, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 521 days.

(21) Appl. No.: 10/994,570

(22) Filed: Nov. 22, 2004

(65) Prior Publication Data

US 2006/0110163 A1 May 25, 2006

(51) Int. Cl.
*H04B 10/00* (2006.01)
(52) U.S. Cl. ..................... 398/128; 398/121
(58) Field of Classification Search ........ 398/118–131; 385/47
See application file for complete search history.

(56) References Cited

U.S. PATENT DOCUMENTS

| | | | | |
|---|---|---|---|---|
| 5,777,768 A | * | 7/1998 | Korevaar | 398/129 |
| 5,870,215 A | * | 2/1999 | Milano et al. | 398/108 |
| 6,327,063 B1 | * | 12/2001 | Rockwell | 398/122 |
| 6,462,846 B1 | * | 10/2002 | DeLong | 398/135 |
| 7,162,157 B2 | * | 1/2007 | Paoli | 398/128 |

* cited by examiner

*Primary Examiner*—Agustin Bello
(74) *Attorney, Agent, or Firm*—Patti, Hewitt & Arezina LLC

(57) ABSTRACT

Apparatus, and a corresponding method, for spatially isolating a transmit beam and a receive beam, which, in satellite communication systems, are inherently separated by a look ahead angle. A receive beam separation mirror is positioned in the receive beam path but out of the transmit beam path, and the receive beam is reflected along a path separated from the transmit beam path. The mirror may be annular, allowing the transmit beam to be directed through the center of the mirror. In applications where a desired isolation angle is different from the look ahead angle, or where there is no look ahead angle, the receive beam separation mirror is used in conjunction with a dichroic beam splitter and at least one receive beam steering mirror, to achieve the desired angular separation.

10 Claims, 3 Drawing Sheets

SPATIAL TRANSMIT/RECEIVE ISOLATION METHOD FOR OPTICAL COMMUNICATION SYSTEMS

GOVERNMENT RIGHTS

This invention was made with Government support under contract number F04701-03-C-0006 awarded by the Air Force Research Laboratory (AFRL). The Government has certain rights in this invention.

BACKGROUND OF THE INVENTION

This invention relates generally to optical communication systems and, more particularly, to techniques for separating transmit and receive signals at an optical transceiver. Because transmit and receive signals are propagated over paths that are practically collinear, an approach is needed to ensure that signals transmitted from a transceiver do not corrupt or interfere with signals received at the same transceiver.

Known methods for separating and isolating transmit and receive signals include using different wavelengths or different polarization modes for the transmit and receive signals, referred to as wavelength diversity and polarization diversity, respectively. Another known technique uses time diversity to separate the signals, which is to say that the transmit and receive signals occupy different time slots and communication takes place in a simplex mode.

A critical element of the wavelength diversity approach is a dichroic beam splitter, the function of which is to reflect a receive beam but to pass a transmit beam or vice versa. The transmit beam passes through the dichroic beam splitter and proceeds along a transmission path. A receive beam is received over practically the same path and is reflected through a selected angle by the beam splitter. If the beam splitter is oriented at, say, 45° to the transmission path, the receive beam will be reflected through 90° and may then be conveniently processed in an optical receiver without interference with the transmit beam.

A similar separation of the two transmission paths can be effected by a polarization beam splitter, where the transmit beam is vertically polarized, for example, and the receive beam is horizontally polarized, but may be of the same wavelength as the transmit beam. The vertically polarized transmit beam passes through the polarization beam splitter and proceeds along the transmission path. The receive beam, being horizontally polarized, is reflected by the polarization beam splitter and provides the desired separation of the transmit and receive paths. Left and Right handed circular polarizations can also be used with the addition of a quarter wave plate to convert circular to linear polarization.

In a simplex communication link, an optical switch might be used to toggle back and forth between transmit and receive modes. In the transmit mode, the transmit beam passes through the optical switch and proceeds along the transmission path. In the receive mode, the receive beam enters the optical switch from the transmission path and is routed to the receive port while the transmit signal is routed to a dumped port. Once again, the transmit and receive signals may have the same wavelength.

All three of these prior art approaches have significant shortcomings. In order to obtain a high degree of isolation in the wavelength diversity approach, the dichroic beam splitter has to be designed to have many coating layers to effect the desired wavelength separation. Such a complex design is likely to have more insertion loss than a dichroic beam splitter of simpler design. Alternatively, the transmit and receive wavelengths may be selected to be widely spaced, but doing so may significantly limit the number of wavelengths that can be used within a limited optical amplifier bandwidth. The dichroic beam splitter may be designed with this trade-off between splitter complexity and wavelength separation in mind, but the wavelength diversity approach always requires some combination of design complexity and wide wavelength separation to produce a desirably high degree of isolation between the transmit and receive beams.

In the polarization isolation approach, the polarization beam splitter provides isolation performance of typically around 20 to 30 deciBels (dB), or 40 dB at best. The isolation required for ultra-long distance laser communication is, however, greater than 110 dB. Therefore, using polarization diversity for isolation also requires the use of other means to provide additional isolation. An in-fiber filter can typically provide an additional 60 dB of isolation, but this might not be sufficient for some applications. Depending where this filter is installed in relation to an optical low-noise amplifier, additional losses may be incurred as a result of the filter's use. Another drawback of polarization isolation is that photonics components using required polarization in space communications may be difficult to obtain and qualify for use.

Finally, the simplex approach is the most straightforward but, of course, has inherent limitations in comparison with a full duplex communication system. In addition, an optical switch approach provides around 50 dB of isolation. Other means of isolation will be required.

It will be appreciated, therefore, that there is still a significant need for an alternative approach to separation of transmit and receive beams in an optical communication system. The present invention satisfies this need.

SUMMARY OF THE INVENTION

The present invention employs a spatial isolation approach to provide a high degree of isolation between transmit and receive beams in an optical communication system. Briefly, and in general terms, the apparatus of the present invention comprises a mirror having a receive beam region; and means for orienting and positioning the mirror such that a receive optical beam propagating along a receive path impinges on the receive beam region of the mirror and is reflected therefrom, and a transmit beam can proceed along a transmit path without impinging on the mirror. The receive path and the transmit path are approximately collinear, but not necessarily exactly collinear. In one disclosed embodiment of the invention, the optical communication system communicates with an orbiting satellite and the receive path and transmit path are inherently separated by a small look ahead angle.

Preferably, the mirror is annular in shape and has a center aperture; and the transmit beam is directed through the center aperture.

Another embodiment of the apparatus further comprises a dichroic beam splitter oriented and located to reflect the transmit beam and pass the receive beam, where the transmit and receive beams are of different wavelengths; and a steering mirror oriented and located to reflect the receive beam, after it passes through the dichroic beam splitter, onto the receive beam region. The steering mirror effects a desired degree of angular separation between the transmit beam and the receive beam. This embodiment of the invention may be used in space communication systems in which the receive path and transmit path are inherently separated by a look ahead angle, or in terrestrial systems in which there is no inherent look ahead angle and the receive path and transmit path are collinear. The apparatus may further comprise a second steering mirror, oriented and located to reflect the receive beam along a desired path after reflection from the receive beam region.

In terms of a novel method for isolating a transmit beam and a receive beam in an optical communication system, the invention comprises the steps of reflecting a receive beam from a mirror having a receive beam region; and orienting and positioning the mirror such that the receive beam propagating along a receive path impinges on the receive beam region of the mirror and is reflected therefrom; and directing a transmit beam along a transmit path without impinging on the mirror, the receive path and the transmit path being approximately, but not necessarily exactly, collinear.

It will be appreciated from this brief summary that the present invention represents a significant advance in the field of optical communication systems. In particular, the invention provides a simple but highly effective technique for isolating transmit and receive beams, without the need for polarization optics or complex dichroic optics. Other aspects and advantages of the invention will become apparent from the following more detailed description, taken in conjunction with the accompanying drawings.

DETAILED DESCRIPTION OF THE INVENTION

Figure 1:
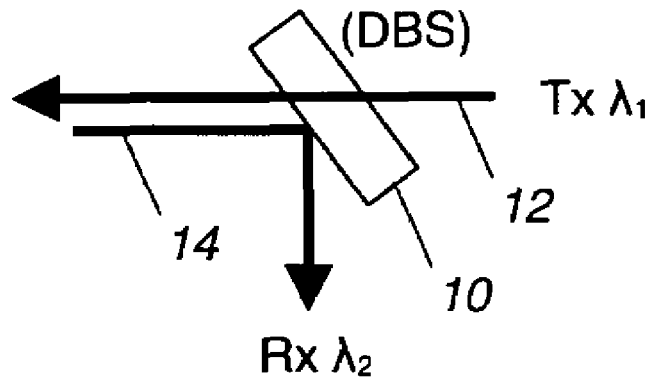
FIG. 1 is block diagram depicting the use of wavelength diversity for isolation of transmit and receive beams.
Figure 2:
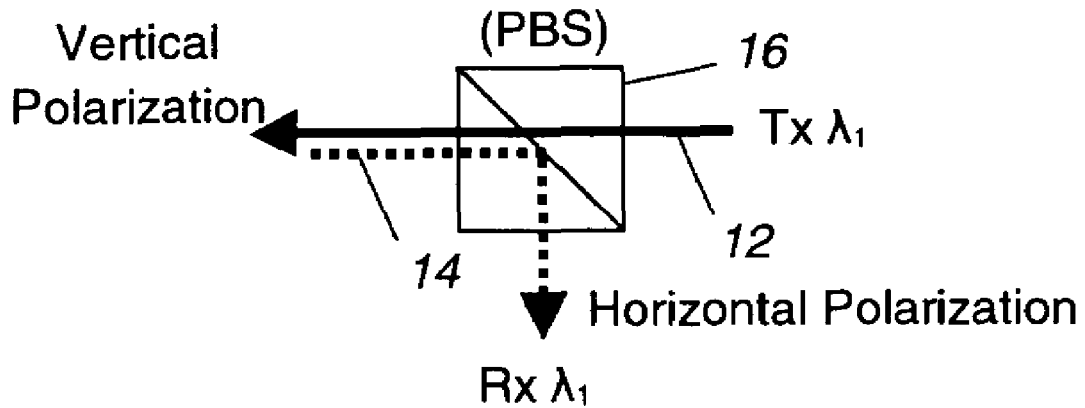
FIG. 2 is a block diagram depicting the use of polarization diversity for isolation of transmit and receive beams.
Figure 3:
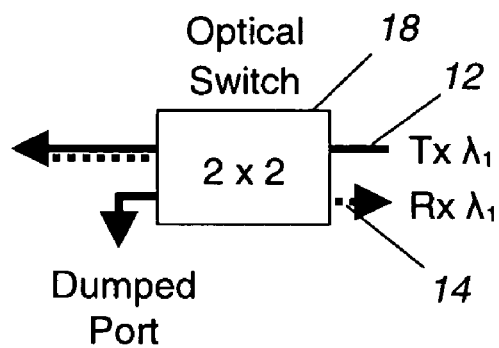
FIG. 3 is a block diagram depicting the use of a simplex communication link for isolation of transmit and receive beams.

As shown in the drawings for purposes of illustration, the present invention pertains to optical communication systems and to the need for an improved technique for isolating transmit and receive beams. FIG. 1 shows a dichroic beam splitter (DBS) 10 as used in prior art systems to isolate a transmit beam 12 at wavelength $\lambda_1$ from a receive beam 13 at wavelength $\lambda_2$. FIG. 2 shows the use of a polarization beam splitter (PBS) 16 for performing a similar function, when the transmit beam 12 and receive beam 14 may have the same wavelength. FIG. 3 shows the use of a 2×2 optical switch 18 to provide temporal separation of the transmit beam 12 and receive beam 14, in a simplex communication link. The drawbacks of these prior art techniques are discussed above in the background section of this specification.

Figure 4:
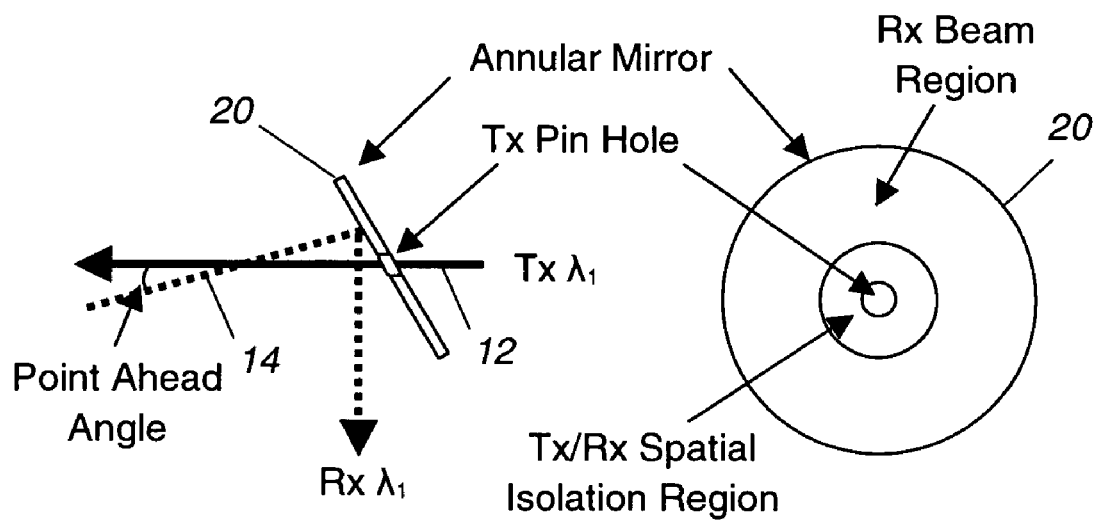
FIG. 4 is a block diagram depicting the use of spatial separation to isolate transmit and receive beams in accordance with the present invention.

In accordance with the present invention, the transmit beam 12 and receive beam 14 can be isolated spatially by taking advantage of a "point ahead" angle associated with most optical space communication systems. It is well known that in communicating with an orbiting satellite, a ground station must aim its transmit beam at a point in space in advance of the moving satellite. This is necessitated by the satellite's orbital velocity, which is greater than the velocity of the ground station. The speed of propagation of the communication beam is, of course, finite and requires aiming the transmit beam at the point ahead angle in advance of the satellite as it moves in its orbit. In effect, this phenomenon results in there being a small angular separation between the transmit beam 12 and the receive beam 14 at any instant in time. As shown in FIG. 4, in which the point ahead angle is exaggerated in magnitude for purposes of illustration, a mirror 20 may be positioned to separate the receive beam 14 without having any effect on the transmit beam 12. Specifically, if the mirror 20 is an annular one, it can be oriented and positioned such that the transmit beam 12 passes through the open center aperture of the mirror, while the receive beam 14 impinges on the annular receive-beam region of the mirror and is reflected through a desired angle for further processing in an optical receiver (not shown). Use of an annular mirror 20 has the additional advantage that the angle between the transmit beam 12 and the receive beam 14 may be quite small. Further, the annular mirror 20 may, for example, be sized to accommodate a transmit fiber core (or core and cladding) at its center aperture. More generally, the mirror 20 need not be angular, but may simply be a plane mirror positioned in the path of the receive beam 14 and out of the path of the transmit beam 12.

Figure 5:
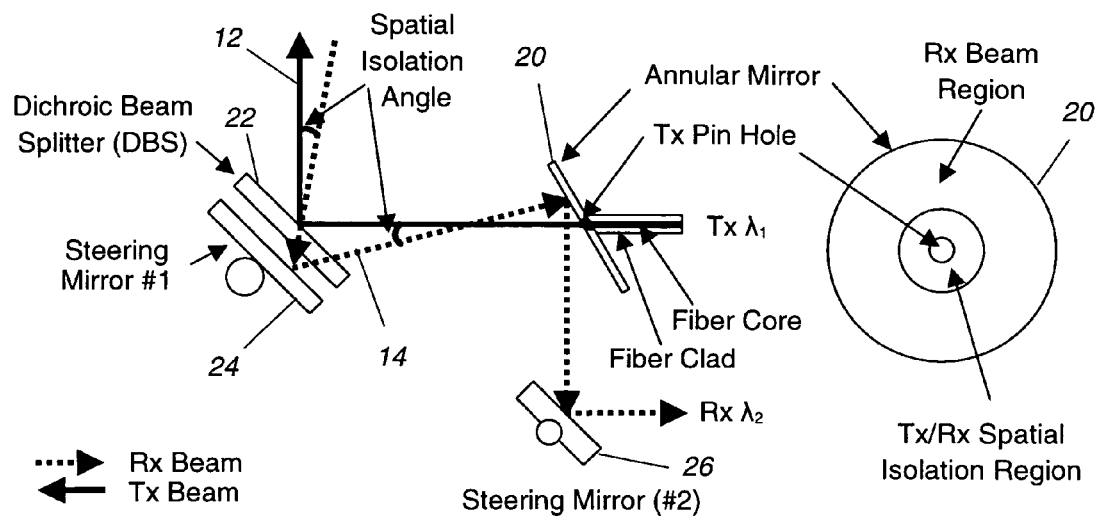
FIG. 5 is a block diagram similar to FIG. 4, but depicting the use of a dichroic beam splitter to enhance spatial separation of the transmit and receive beams.

In an alternative embodiment of the invention, shown in FIG. 5, a dichroic beam splitter (DBS) 22 is used, in conjunction with first and second steering mirrors 24 and 26 to provide additional control over the spatial separation angle between the transmit beam 12 and receive beam 14. The DBS 22 reflects the transmit beam, at wavelength $\lambda_1$, and passes the receive beam 14, at wavelength $A_2$. The receive beam 14 is reflected from the first steering mirror 24 onto the annular mirror 20, from which it is further reflected to the second steering mirror 26. The steering mirrors 24 and 26 allow selection of a spatial isolation angle that can be greater than or less than the look ahead angle. The second beam steering mirror 26 typically directs the receive beam 14 into a receive fiber (not shown). In this configuration, the optical components are of relatively simple design with no requirement for polarization control, and the transmit and receive wavelengths may be closely or widely spaced, as desired. Alternatively the second steering mirror (26) can be deleted and the optical components required for the receive function can be positioned appropriately.

Figure 6:
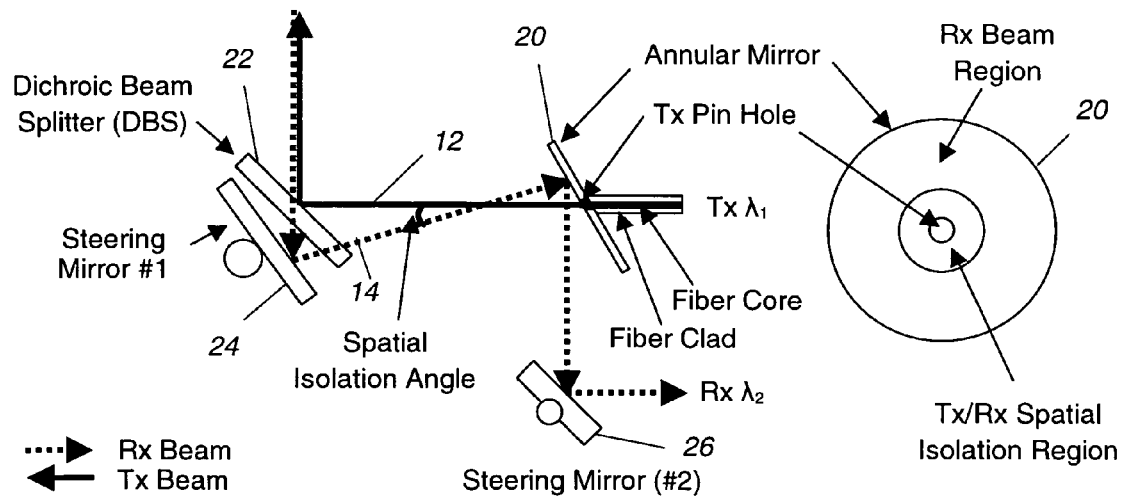
FIG. 6 is a block diagram similar to FIG. 5, for use in which transmit and receive signals are transmitted along essentially identical paths without any angular separation due to a look-ahead angle.

FIG. 6 shows the same basic embodiment as FIG. 5, but used in an application where there is no look ahead angle between the transmit beam 12 and receive beam 14. The typical application in this instance would be a terrestrial communication system. In space communication systems, it is difficult to conceive of a practical situation in which there was no lateral motion of one communication node with respect to the other and, therefore, no look ahead angle. In FIG. 6, the transmit beam 12 and receive beam 14 are assumed to be perfectly aligned. Spatial separation may nevertheless be obtained by using the DBS 22 and the first steering mirror 24 to ensure that the receive beam 14 impinges on the annular mirror 20 and is reflected along a desired receive path, preferably by using the second steering mirror 26.

The steering mirrors 24 and 26 in FIGS. 5 and 6, in conjunction with the DBS 22, provide a desired degree of isolation of the transmit beam 12 and receive beam 14, regardless of the presence or absence of a look ahead angle between the two beams. As noted with reference to FIG. 4, the mirror 20 is preferably annular in shape to facilitate coupling to a transmit fiber 30 (FIGS. 5 and 6), but the invention is not limited to the use of an annular configuration for the mirror 20.

The DBS 22 in FIGS. 5 and 6 may also be implemented with diffraction grating filters. This type of filter, however, has some inherent difficulties relating to its wavelength resolving power and its possible dispersion effect on the optical signals. For these reasons, the diffraction grating implementation is not presently preferred, but may be used if the inherent drawbacks of such an implementation can be overcome or are not critical for a particular application.

It will be appreciated from the foregoing that the present invention provides a simple but effective approach for isolation of transmit and receive beams in an optical communication system. In particular, the invention provides spatial separation of the transmit and receive beams without the need for polarization optics or complex dichroic optics. In applications in which the transmit and receive beams are already separated by a look ahead angle, one configuration of the invention effects isolation without the need for any dichroic optical components. It will also be appreciated that, although various embodiments of the invention have been described in detail for purpose of illustration, various modifications may be made without departing from the spirit and scope of the invention. Accordingly, the invention should not be limited except as by the appended claims.

The invention claimed is:

1. Apparatus for isolating transmit and receive optical beams in an optical communication system, wherein the transmit and receive optical beams are of different wavelengths, the apparatus comprising:
   an annular mirror having a receive beam region and a center aperture;
   a first steering mirror;
   a dichroic beam splitter oriented and located to receive the transmit optical beam through the center aperture of the annular mirror and to reflect the transmit beam along a transmit path;
   wherein the dichroic beam splitter is oriented and located to receive the receive optical beam along a receive path and to pass the receive optical beam to the first steering mirror;
   wherein the first steering mirror is oriented and located to receive the receive optical beam from the dichroic beam splitter and to reflect the receive optical beam to the receive beam region of the annular mirror, wherein the steering mirror effects a desired degree of angular separation between the transmit optical beam and the receive optical beam;
   means for orienting and positioning the annular mirror such that the receive optical beam impinges on the receive beam region of the annular mirror and is reflected therefrom, and the transmit optical beam can proceed toward the dichroic beam splitter without impinging on the annular mirror.

2. Apparatus as defined in claim 1, wherein:
   the optical communication system communicates with an orbiting satellite; and
   the receive path and transmit path are inherently separated by a look ahead angle.

3. Apparatus as defined in claim 1, wherein:
   the optical communication system links terrestrial stations; and
   the receive path and the transmit path are collinear.

4. Apparatus as defined in claim 1, and further comprising a second steering mirror, oriented and located to receive the receive optical beam from the receive beam region of the annular mirror and to reflect the receive optical beam along a desired path.

5. Apparatus as defined in claim 2, wherein the desired degree of angular separation between the transmit optical beam and the receive optical beam is equal to the look ahead angle.

6. A method for isolating a transmit optical beam and a receive optical beam in an optical communication system, the method comprising:
   receiving the receive optical beam along a receive path at a dichroic beam splitter and passing the receive optical beam through the dichroic beam splitter to a first steering mirror;
   reflecting the receive optical beam from the first steering mirror to an annular mirror having a receive beam region and a center aperture;
   orienting and positioning the annular mirror such that the receive optical beam impinges on the receive beam region of the mirror and is reflected therefrom to a second steering minor;
   orienting and positioning the annular mirror such that the transmit optical beam can proceed toward the dichroic beam splitter through the center aperture without impinging on the annular mirror;
   orienting and positioning the dichroic beam splitter to receive the transmit optical beam through the center aperture of the annular mirror and to reflect the transmit beam along a transmit path;
   orienting and positioning the first steering mirror to effect a desired degree of angular separation between the transmit optical beam and the receive optical beam.

7. A method as defined in claim 6, wherein:
   the optical communication system communicates with an orbiting satellite; and
   the receive path and transmit path are inherently separated by a look ahead angle.

8. A method defined in claim 6, wherein:
   the optical communication system links terrestrial stations; and
   the receive path and transmit path are collinear.

9. A method as defined in claim 6, and further comprising orienting and locating the second steering mirror to reflect the receive optical beam along a desired path after reflection from the receive beam region.

10. A method as defined in claim 7, wherein the step of orienting and positioning the first steering mirror comprises the step of:
   orienting and positioning the first steering mirror such that the desired degree of angular separation between the transmit optical beam and the receive optical beam is equal to the look ahead angle.

* * * * *